(12) United States Patent
Nydam et al.

(10) Patent No.: US 8,888,173 B2
(45) Date of Patent: Nov. 18, 2014

(54) VEHICLE SIDE BODY STRUCTURE

(71) Applicant: Nissan North America, Inc., Franklin, TN (US)

(72) Inventors: Scott Nydam, Farmington Hills, MI (US); Kenneth Ameloot, Roseville, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/852,717

(22) Filed: Mar. 28, 2013

(65) Prior Publication Data

US 2014/0292031 A1    Oct. 2, 2014

(51) Int. Cl.
| B62D 25/04 | (2006.01) |
| B62D 25/08 | (2006.01) |
| B62D 25/02 | (2006.01) |

(52) U.S. Cl.
CPC .............. B62D 25/025 (2013.01); B62D 25/04 (2013.01)
USPC ............ 296/203.03; 296/187.12; 296/193.05; 296/193.06; 296/30; 296/209

(58) Field of Classification Search
CPC ...... B62D 25/02; B62D 25/025; B62D 25/04; B62D 27/02; B62D 27/023; B62D 27/00
USPC ............. 296/187.12, 193.05, 193.06, 203.03, 296/29, 30, 209
See application file for complete search history.

(56) References Cited

U.S. PATENT DOCUMENTS

| 4,550,948 | A |   | 11/1985 | Hamada et al. |
| 5,246,264 | A | * | 9/1993 | Yoshii ....................... 296/203.03 |
| 5,370,438 | A | * | 12/1994 | Mori et al. ............... 296/203.02 |
| 5,443,297 | A | * | 8/1995 | Tanaka et al. ............ 296/203.03 |
| 5,586,799 | A | * | 12/1996 | Kanemitsu et al. ...... 296/203.02 |
| 5,653,495 | A | * | 8/1997 | Bovellan et al. ......... 296/203.03 |
| 5,810,428 | A | * | 9/1998 | Maki ......................... 296/203.02 |
| 5,860,694 | A | * | 1/1999 | Seefried et al. .......... 296/203.03 |
| 5,984,402 | A | * | 11/1999 | Takeuchi .................. 296/187.12 |
| 6,053,564 | A | * | 4/2000 | Kamata et al. ........... 296/187.09 |
| 6,293,617 | B1 |   | 9/2001 | Sukegawa |
| 6,447,052 | B2 | * | 9/2002 | Saeki ........................ 296/187.09 |
| 6,648,404 | B2 | * | 11/2003 | Yakata et al. ................. 296/209 |
| 6,698,823 | B2 | * | 3/2004 | Kim .......................... 296/203.03 |
| 7,510,234 | B2 |   | 3/2009 | Ameloot et al. |

(Continued)

FOREIGN PATENT DOCUMENTS

FR    2933059 A1    1/2010

*Primary Examiner* — Gregory Blankenship
(74) *Attorney, Agent, or Firm* — Global IP Counselors, LLP

(57) ABSTRACT

A vehicle side body structure includes a sill, an A-pillar and a reinforcement member. The sill defines an internal sill space and the A-pillar defines an internal A-pillar space. The A-pillar is rigidly connected to the sill with the internal sill space and the internal A-pillar space being connected. The reinforcement member is located within the internal sill space and the internal A-pillar space. The reinforcement member has a forward end fixedly attached to the sill at a front attachment point and a rearward end fixedly attached to the A-pillar at a rear attachment point that is laterally offset from the front attachment point. The reinforcement member includes a main bracing part that extends diagonally between the front and rear attachment points within both the internal sill space and the internal A-pillar space with respect to a vehicle longitudinal direction.

20 Claims, 8 Drawing Sheets

(56) References Cited

U.S. PATENT DOCUMENTS

| | | | |
|---|---|---|---|
| 8,662,575 B2 * | 3/2014 | Tamura | 296/209 |
| 8,678,481 B2 * | 3/2014 | Tamura | 296/193.05 |
| 8,690,227 B2 * | 4/2014 | Matsuoka et al. | 296/187.09 |
| 2001/0020797 A1 * | 9/2001 | Saeki | 296/203.03 |
| 2003/0102697 A1 * | 6/2003 | Yakata et al. | 296/209 |
| 2010/0270828 A1 * | 10/2010 | Baccouche et al. | 296/187.12 |
| 2012/0119546 A1 * | 5/2012 | Honda et al. | 296/203.01 |
| 2013/0200650 A1 * | 8/2013 | Matsuoka et al. | 296/187.1 |

* cited by examiner

VEHICLE SIDE BODY STRUCTURE

BACKGROUND

1. Field of the Invention

The present invention generally relates to a vehicle side body structure. More specifically, the present invention relates to a vehicle side body structure where the area between an A-pillar and a sill also includes a reinforcement member.

2. Background Information

Vehicle body structures are regularly being redesigned to include structural features that absorb impact forces in response to impact events. Recently introduced impact event tests include a small overlap test where a vehicle is provided with velocity in a vehicle longitudinal direction such that a front corner of the vehicle (approximately 25 percent of the overall width of the vehicle) impacts a fixed, rigid barrier. FIGS. 1, 2 and 3 schematically show an example of a conventional vehicle C undergoing an impact event with a fixed barrier B in accordance with the small overlap test.

FIG. 1 shows the conventional vehicle C approaching the rigid barrier B in the small overlap test. FIG. 2 shows the conventional vehicle C just after initial impact with the rigid barrier B showing initial deformation and the velocity of the vehicle C being partially transformed into rotational displacement about the rigid barrier B. FIG. 3 shows the conventional vehicle C undergoing further deformation as a result of the impact event, and undergoing further rotational displacement about the rigid barrier B such that a rear end of the conventional vehicle C swings laterally and outwardly away from the rigid barrier B.

SUMMARY

One object is to reinforce the intersection between an A-pillar and a sill of a vehicle side body structure.

In view of the state of the known technology, one aspect of the present disclosure is to provide a vehicle side body structure with a sill, an A-pillar and a reinforcement member. The sill includes an inner sill panel having an inner sill outboard surface and an outer sill panel having an outer sill inboard surface. The inner and outer sill panels are rigidly connected together to define an internal sill space between the inner sill outboard surface and the outer sill inboard surface. The A-pillar includes an inner A-pillar panel having an inner A-pillar outboard surface and an outer A-pillar panel having an outer A-pillar inboard surface. The inner and outer A-pillar panels are rigidly connected together to define an internal A-pillar space between the inner A-pillar outboard surface and the outer A-pillar inboard surface. The A-pillar is rigidly connected to the sill with the internal sill space and the internal A-pillar space being connected. The reinforcement member is located within both the internal sill space and the internal A-pillar space. The reinforcement member has a forward end fixedly attached to at least one of the sill and the A-pillar at a front attachment point and a rearward end fixedly attached to at least one of the sill and the A-pillar at a rear attachment point that is laterally offset from the front attachment point. The reinforcement member includes a main bracing part that extends diagonally between the front and rear attachment points within both the internal sill space and the internal A-pillar space with respect to a vehicle longitudinal direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 4:
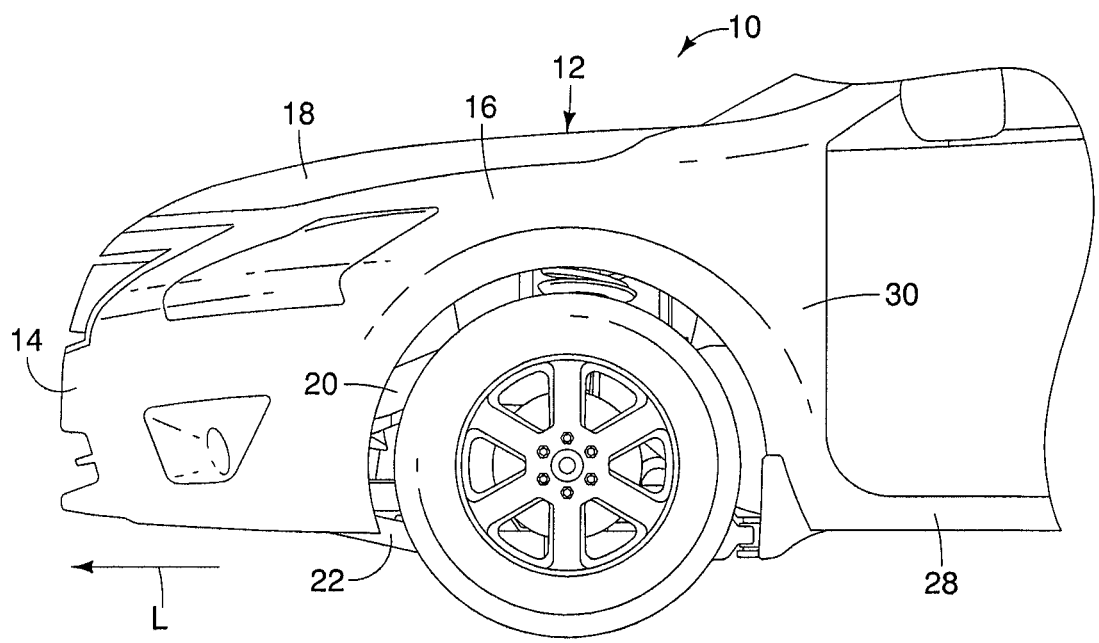
FIG. 4 is a side view of a front end of the vehicle in accordance with a first embodiment.
Figure 5:
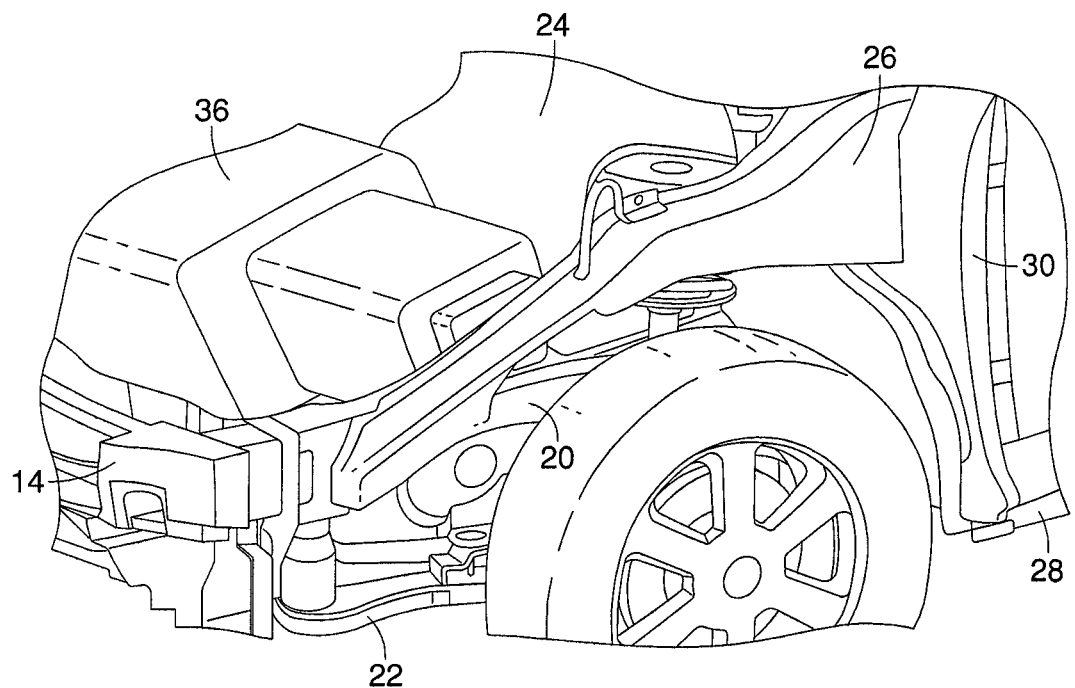
FIG. 5 is a perspective view of the front end of the vehicle with fenders removed showing structural features of the vehicle including an A-pillar and a sill in accordance with the first embodiment.

Referring initially to FIGS. 4-7, a vehicle 10 is illustrated in accordance with various embodiments. The vehicle 10 has a body structure 12 that includes various features such as, among other things, a bumper assembly 14, fenders 16 (only one fender 16 is shown in FIG. 4), a hood 18, a front side member 20, an engine cradle 22, a dash wall 24, a hood ledge 26, a sill 28 and an A-pillar 30.

The bumper assembly 14, the fenders 16, the hood 18, the front side member 20, the engine cradle 22, the dash wall 24 and the hood ledge 26 are all conventional elements, and therefore, description of these portions of the body structure 12 is limited for the sake of brevity.

The bumper assembly 14 is attached to a front end of the front side member 20. The fenders 16 and the hood 18 are exterior panels and are not necessarily structural elements of the vehicle 10. The front side member 20 is a structural member. There are two front side members 20 (only one front side member 20 is shown) located on either side of an engine compartment area of the vehicle 10. The two front side members 20 are the same and therefore description of one applies equally to both. The front side member 20 extends rearward from the bumper assembly 14 below the dash wall 24 and under the floor (not shown) of the passenger compartment of the vehicle 10. The hood ledge 26 is a curved member that extends upward and rearward from an outboard front area of the front side member 20 to the A-pillar 30.

The engine cradle 22 supports an engine assembly 36 (see FIG. 5) and is removably fastened to an underside of each of the front side members 20 in a conventional manner. The dash wall 24 separates the engine compartment and the passenger compartment of the vehicle 10 from one another.

A description of the sill 28 and the A-pillar 30 is provided below after a brief description of a recently developed vehicle test.

Figure 1:
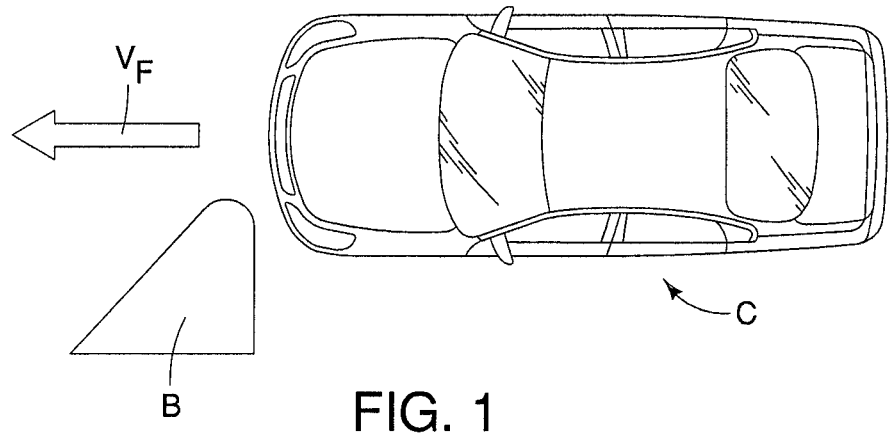
FIG. 1 is a schematic view of a conventional moving vehicle showing its response to a small overlap test where a front corner of the vehicle is aligned with a fixed, rigid barrier for eventual impact with the barrier.
Figure 2:
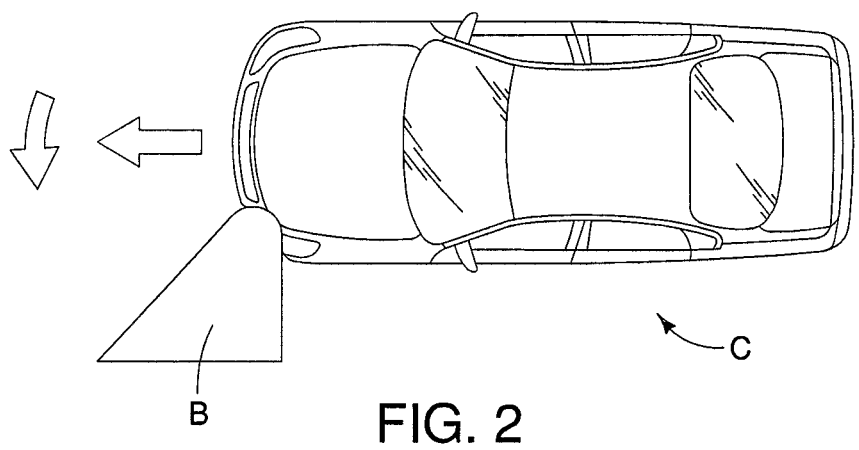
FIG. 2 is another schematic view of the conventional vehicle showing its response to the small overlap test at the beginning of an impact event with the front corner of the conventional vehicle impacting the barrier and beginning to undergo deformation.
Figure 3:
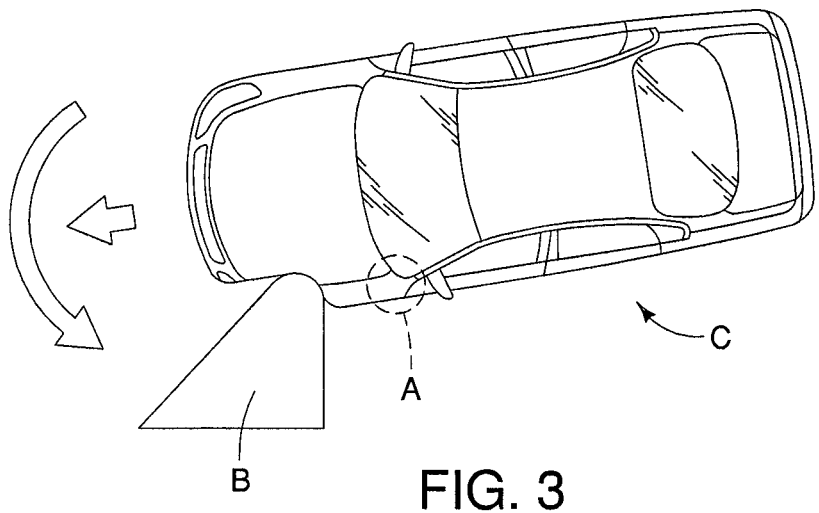
FIG. 3 is still another schematic view of the conventional vehicle showing its response to the small overlap test with the conventional vehicle undergoing further deformation during the impact event.

The Insurance Institute for Highway Safety (IIHS) has developed various tests where vehicles are provided with forward velocity $V_F$ and impacted against fixed, rigid barriers, like the rigid barrier B depicted in FIGS. 1-3. In the IIHS offset tests, the conventional vehicle C is aimed at the rigid barrier B such that approximately 25 percent of the front of the conventional vehicle C impacts the rigid barrier B. In other words, as indicated in FIGS. 1-3, only a front corner of the conventional vehicle C impacts the rigid barrier B. This IIHS test is also known as a narrow offset, or small overlap test. In such tests, a front bumper assembly of the conventional vehicle C is either not impacted, or undergoes only limited contact with the rigid barrier B during the impact event. When the vehicle C is provided with velocity and impacts the rigid barrier B, the rapid deceleration of the vehicle C transforms the kinetic energy associated with the mass and velocity of the vehicle C into deformation of the vehicle C and counter movement of the vehicle C. During the small offset test, the kinetic energy of the vehicle C is partially deflected by structures of the vehicle, absorbed by structures of the vehicle, and partially transformed into, for instance further motion and/or deformation of portions of the vehicle C. Therefore, structures at the front of the conventional vehicle C that impact the rigid barrier B absorb at least some of the impacting force that results from the impact event. For example, a majority of the impacting force is absorbed by the A-pillar and transferred to non-impacted structures of the vehicle C, such as cross members within the vehicle C.

The small overlap test is represented schematically in FIGS. 1-3. During the impact event, a variety of structures undergo deformation. This deformation is not explicitly depicted in FIGS. 2 and 3 with any degree of accuracy because such deformation varies from conventional vehicle to conventional vehicle, depending upon the overall design of the front structure of the conventional vehicle C. Instead, in FIG. 3, the conventional vehicle C is depicted with a generic degree of deformation as a result of the impact event. During the impact event with the rigid barrier B, a portion of the kinetic energy of the vehicle C is partially absorbed by deformation of structures of the vehicle C and another portion of the kinetic energy of the vehicle C is transformed into rotational or lateral movement of the conventional vehicle C such that it swings laterally away from the rigid barrier B, as indicated in FIG. 3.

As is indicated in FIG. 3, an area A where the sill and A-pillar of the vehicle C area may lie along a path coinciding with the rigid barrier B. Therefore, the area A of the vehicle C may absorb at least a portion of the kinetic energy associated with the velocity of the vehicle C.

The vehicle 10 of the various embodiments described below, includes a reinforcement member 40 shown in FIGS. 8 and 9 (described below) that strengthens the area at an intersection of the sill 28 and the A-pillar 30.

Figure 8:
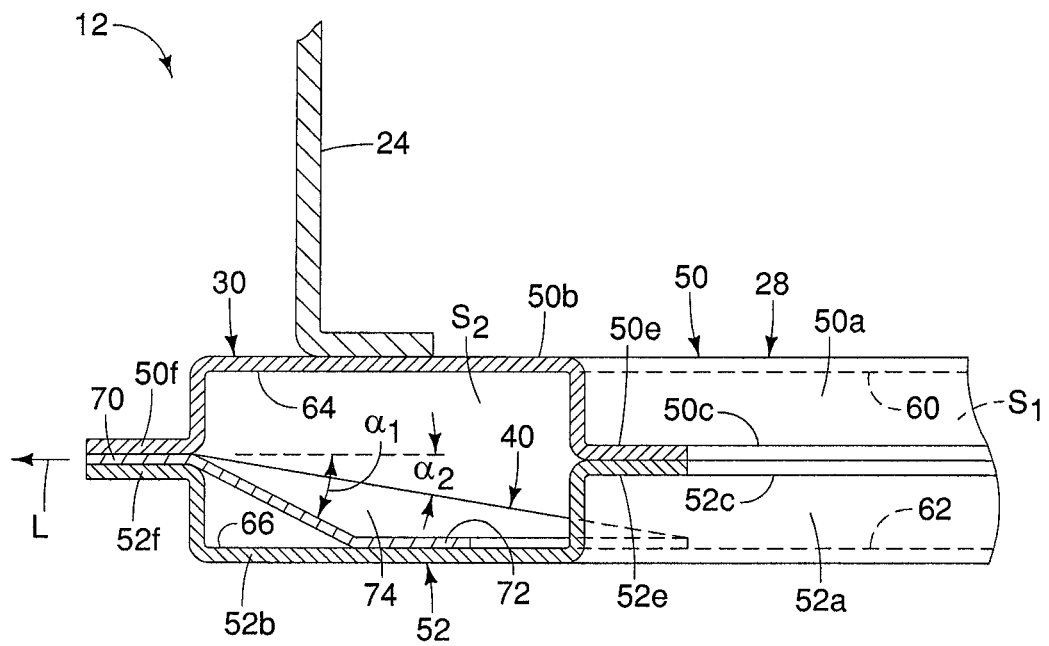
FIG. 8 is a cross-sectional view of the A-pillar taken along the line 8-8 in FIG. 6, showing details of the A-pillar, the sill and a reinforcement member in accordance with the first embodiment.
Figure 9:
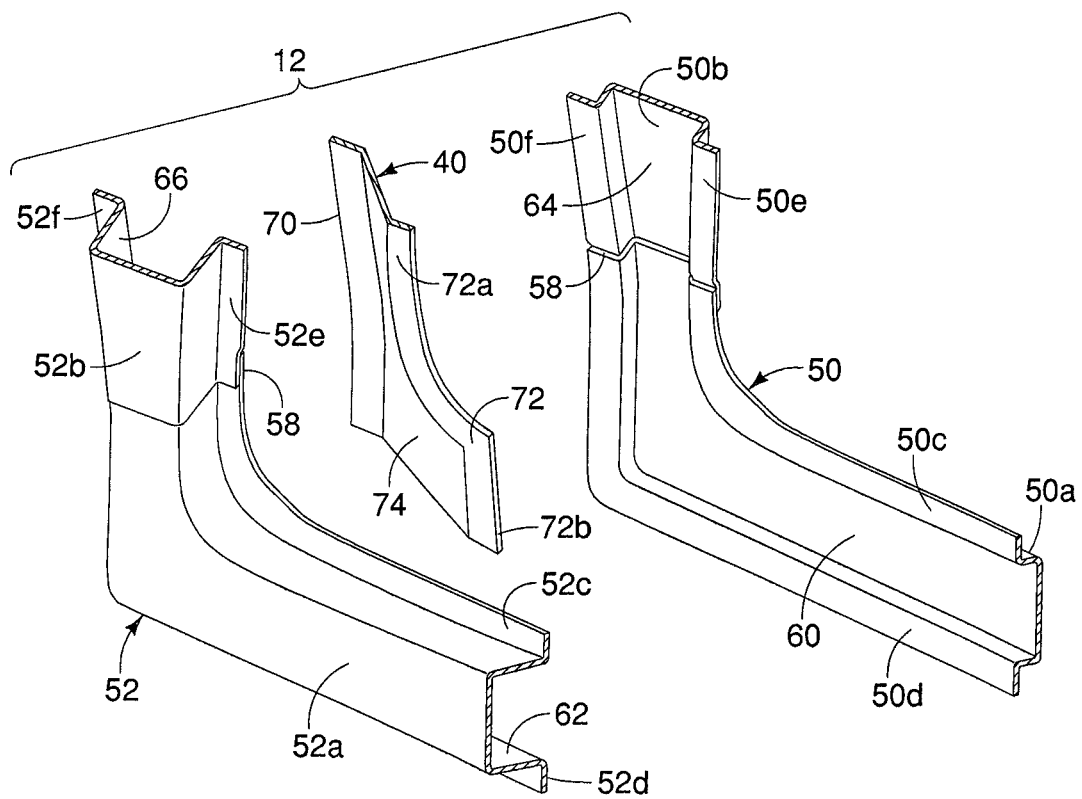
FIG. 9 is an exploded perspective view showing a portion of an inner side panel and an outer side panel that together define the A-pillar and the sill with the reinforcement member disposed therebetween in accordance with the first embodiment.

A description of the sill 28 and the A-pillar 30 is now provided with specific reference to FIGS. 8 and 9. In the depicted embodiment, the body structure 12 includes an inner side panel 50 and an outer side panel 52. The inner side panel 50 is formed, molded, cut and/or stamped using a plurality sheet metal panels that are welded or otherwise fixed together, to define various inboard shapes and surfaces of the vehicle 10. Similarly, the outer side panel 52 is formed, molded, cut and/or stamped from a plurality of single sheet metal panels that are welded or otherwise fixed to each other to define outboard shapes and surfaces of the vehicle 10. Various portions of the inner side panel 50 and outer side panel 52 together define a roof rail 54 (FIG. 7), a B-pillar 56 (FIG. 7), a C-pillar (not shown), the sill 28 and the A-pillar 30.

Figure 6:
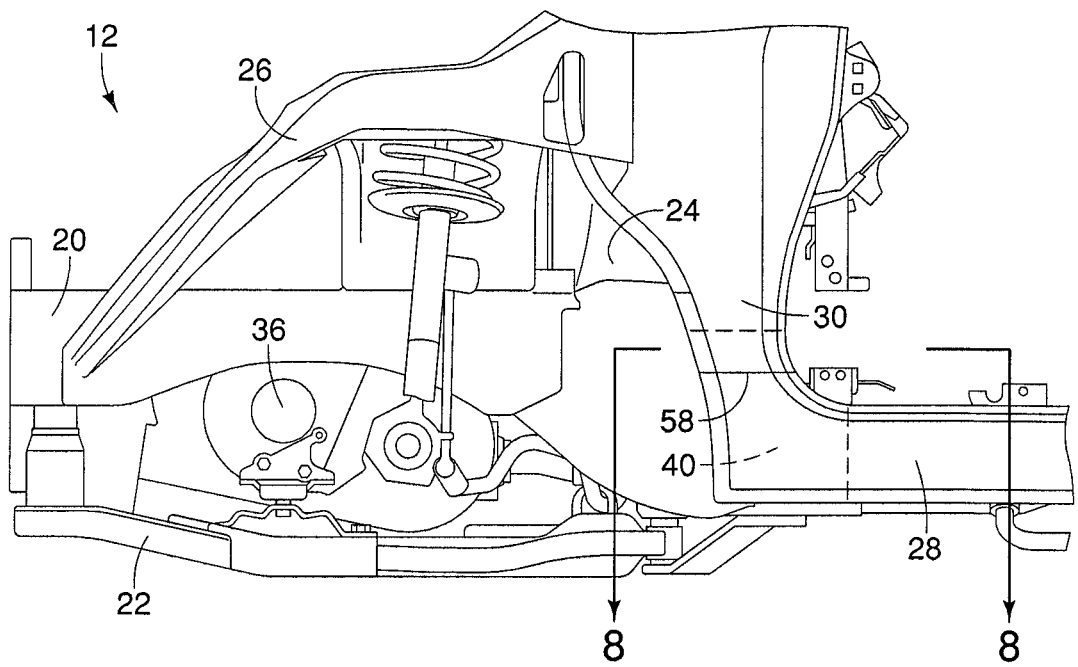
FIG. 6 is another side view of the front end of the vehicle with fenders removed showing details of the A-pillar and the sill in accordance with the first embodiment.
Figure 7:
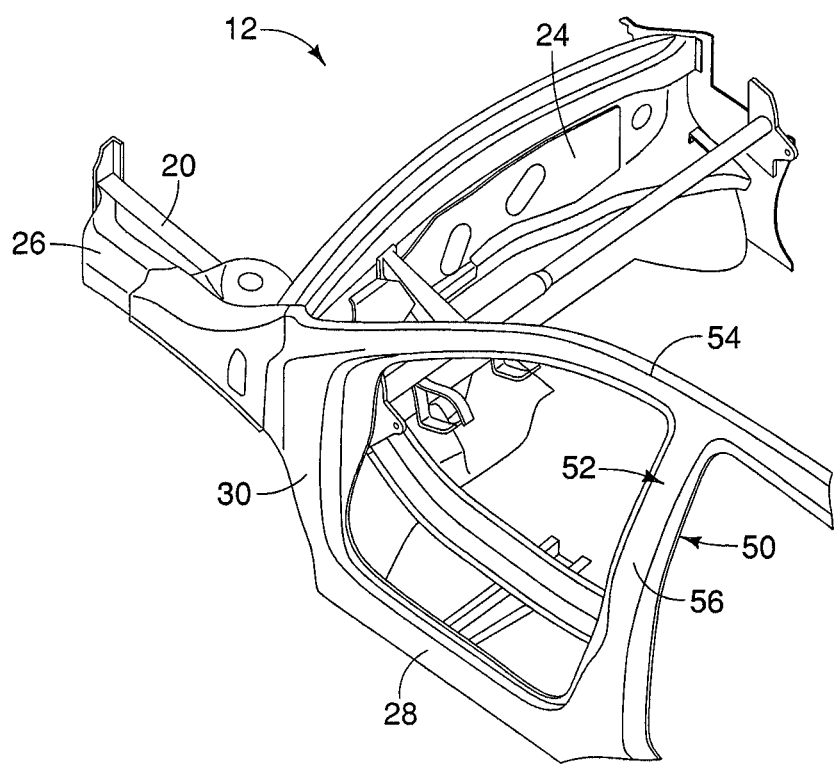
FIG. 7 is another perspective view of the front end of the vehicle showing the A-pillar and the sill in accordance with the first embodiment.

Hence, the sill 28 and A-pillar 30 (as well as the roof rail 54, the B-pillar 56 and the C-pillar) are each constructed from a plurality of separate panels welded or otherwise rigidly fixed to one another. However, it should be understood from the drawings and the description herein that each of the inner side panel 50 and the outer side panel 52 can each be made of a single sheet metal plate, cut and pressed into the depicted overall shape. In other words, the inner side panel 50 and the outer side panel 52 can each be a single, unitary, monolithic element. In FIG. 6, a seam 58 is depicted showing a seam between the sill 28 and the A-pillar 30. It should be understood from the drawings and the description herein that the seam 58 between the sill 28 and the A-pillar 30 can be located at any of a variety of locations. In the depicted embodiments, the seam 58 is an overlapping of two sheet metal portions, welded together. The seam 58 located above the sill 28 near the bottom of the A-pillar 30.

The area where the sill 28 and the A-pillar 30 join together is an intersection that defines a front lower corner of a door opening of the body structure 12. In the vicinity of this intersection, the sill 28 extends in a generally horizontal direction and the A-pillar 30 extends in a generally vertical direction. Therefore the intersection between the sill 28 and the A-pillar 30 substantially defines a right angle (plus or minus a couple of degrees) in the overall construction of the body structure 12.

Since the inner side panel 50 can alternatively be made of a plurality of smaller panels fitted together, the portion of the inner side panel 50 that corresponds to the sill 28 is hereinafter referred to as an inner sill panel 50a. The inner sill panel 50a has an upper flange 50c and a lower flange 50d. Similarly, the portion of the inner side panel 50 that corresponds to the A-pillar 30 is hereinafter referred to an inner A-pillar panel 50b. The inner A-pillar panel 50b has a rearward flange 50e and a forward flange 50f.

As well, the portion of the outer side panel 52 that corresponds to the sill 28 is hereinafter referred to as an outer sill panel 52a. The outer sill panel 52a has an upper flange 52c and a lower flange 52d. Similarly, the portion of the outer side panel 52 that corresponds to the A-pillar 30 is hereinafter referred to an outer A-pillar panel 52b. The outer A-pillar panel 52b has a rearward flange 52e and a forward flange 52f.

Hence, the sill 28 includes the inner sill panel 50a and the outer sill panel 52a fixedly attached to one another. For instance, the upper flange 50c is welded to the upper flange 52c and the lower flange 50d can be welded to the lower flange 52d. The inner sill panel 50a has an inner sill outboard surface 60 and the outer sill panel 52a has an outer sill inboard surface 62. The inner and outer sill panels 50a and 52a define an internal sill space $S_1$ between the inner sill outboard surface 60 and the outer sill inboard surface 62.

Similarly, the A-pillar 30 includes the inner A-pillar panel 50b and the outer A-pillar panel 52b that are fixedly attached to one another. For instance, the rearward flange 50e can be welded to the rearward flange 52e and the forward flange 50f is welded to the forward flange 52f. The inner A-pillar panel 50b has an inner A-pillar outboard surface 64. The outer A-pillar panel 52b has an outer A-pillar inboard surface 66. The inner and outer A-pillar panels 50b and 52b are rigidly connected together to define an internal A-pillar space $S_2$ between the inner A-pillar outboard surface 64 and the outer A-pillar inboard surface 66. The A-pillar 28 is rigidly connected to the sill 30 with the internal sill space $S_1$ and the internal A-pillar $S_2$ space being connected and/or open to one another.

The reinforcement member 40 is a contoured panel shaped to include a forward end 70, a rearward end 72 and a main bracing part 74 extending therebetween. The forward end 70 basically defines a flange that is inserted between the forward flange 50f of the inner A-pillar panel 50b and the forward flange 52f of the outer A-pillar panel 52b. The forward flange 50f, the forward flange 52f and the forward end 70 of the reinforcement member 40 are rigidly fixed to one another (for example, welded together), as indicated in FIG. 8, thereby defining a front attachment point.

The rearward end 72 includes an upper end 72a and a lower end 72b. The rearward end 72 of the reinforcement member 40 basically defines a flange that extends from the upper end 72a to the lower end 72b. The rearward end 72 is rigidly fixed to both the outer sill inboard surface 62 and the outer A-pillar inboard surface 66 by, for example, fasteners and/or welding. More specifically, the upper end 72a is fixedly attached to the outer A-pillar inboard surface 66 of the outer A-pillar panel 52b and the lower end 72b is fixedly attached to the outer sill inboard surface 62 of the outer sill panel 52a. The contact area between the flange defined by the rearward end 72 of the reinforcement member 40, the outer sill inboard surface 62, and the outer A-pillar inboard surface 66 define a rear attachment point that is laterally offset from the front attachment point.

The main bracing part 74 has a contoured shape and extends diagonally between the front and rear attachment points within both the internal sill space $S_1$ and the internal A-pillar space $S_2$ with respect to a vehicle longitudinal direction L.

As shown in FIG. 8, the reinforcement member 40 is therefore located within both the internal sill space $S_1$ and the internal A-pillar space $S_2$. More specifically, a portion of the reinforcement member 40 extends into the internal sill space $S_1$ and a portion of the reinforcement member 40 extends into the internal A-pillar space $S_2$.

The main bracing part 74 is inclined relative to the vehicle longitudinal direction L by an angle $\alpha_1$ of at least 25 degrees, measured at an upper end of the reinforcement member 40, as indicated in FIG. 8. However, the angle $\alpha_1$ can be between 15 and 60 degrees. Further, main bracing part 74 can be contoured such that the angle $\alpha_1$ measured at the top of the main bracing part 74 can differ from an angle $\alpha_2$ measured at the bottom of the main bracing part 74. In the depicted embodiment, the angle $\alpha_1$ is greater than the angle $\alpha_2$.

As is shown in FIG. 9, the distance between the upper end 72a of the rearward end 72 of the main bracing part 74 and the forward end 70 is less than the distance between the lower end 72b of the rearward end 72 of the main bracing part 74 and the forward end 70. Consequently the upper end 72a of the main bracing part 74 is dimensioned to fit within the A-pillar 30, whereas the lower end 72b of the main bracing part 74 is dimensioned to extend within the sill 28 under the vehicle door opening, with the rear attachment point of the reinforcement member being located under the vehicle door opening of the body structure 12. More specifically, the rear attachment point of the reinforcement member 40 is located adjacent to a forward end of the vehicle door opening.

As is shown in FIG. 8, the upper flange 50c and the upper flange 52c are welded to one another defining a connection area therebetween. The upper flange 50c and the upper flange 52c (and the connection area) extend in the vehicle longitudinal direction L. The rearward end 72 of the reinforcement member 40, which defines the rear attachment point of the reinforcement member 40 to the outer sill inboard surface 62, is located outboard of the connection area defined by the upper flange 50c and the upper flange 52c.

When installed within the internal sill space $S_1$ and the internal A-pillar space $S_2$, the reinforcement member 40 reinforces the intersection between the sill 28 and the A-pillar 30. During the small overlap test described with respect to FIG. 1-3, the addition of the reinforcement member 40 enables transfer of kinetic energy from the impact event, from the A-pillar 30 to the sill 28 and the dash wall 24, as well as other elements of the body structure 12, such that there can be a reduction of the overall deformation experienced by the A-pillar 30 during the impact event of the small overlap test.

Second Embodiment

Figure 10:
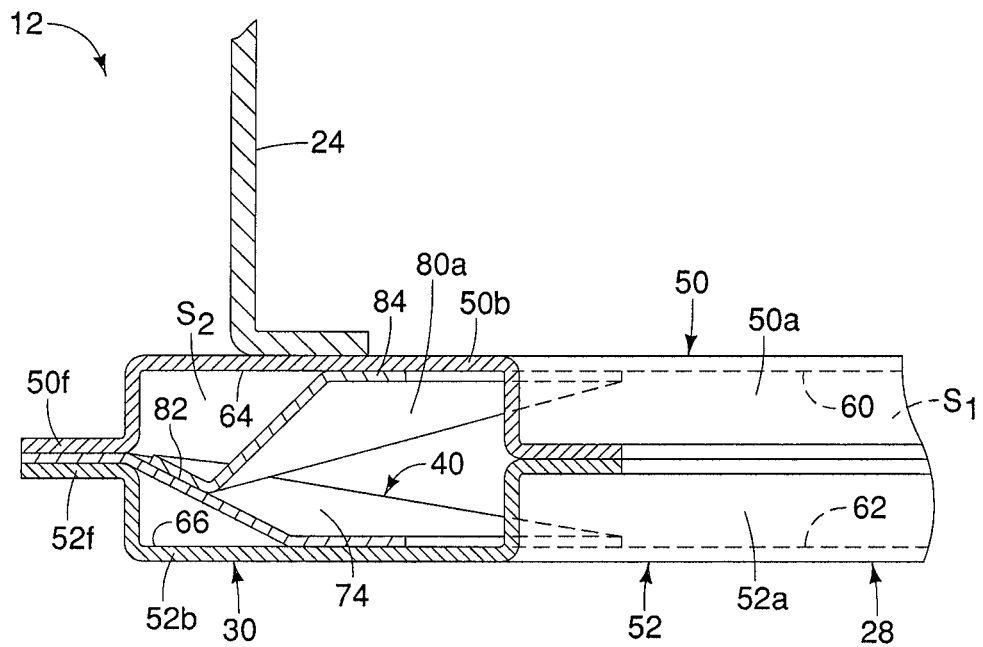
FIG. 10 is a cross-sectional view of the A-pillar similar to FIG. 8, showing details of the A-pillar, the sill, a first reinforcement member and a second reinforcement member in accordance with a second embodiment.
Figure 11:
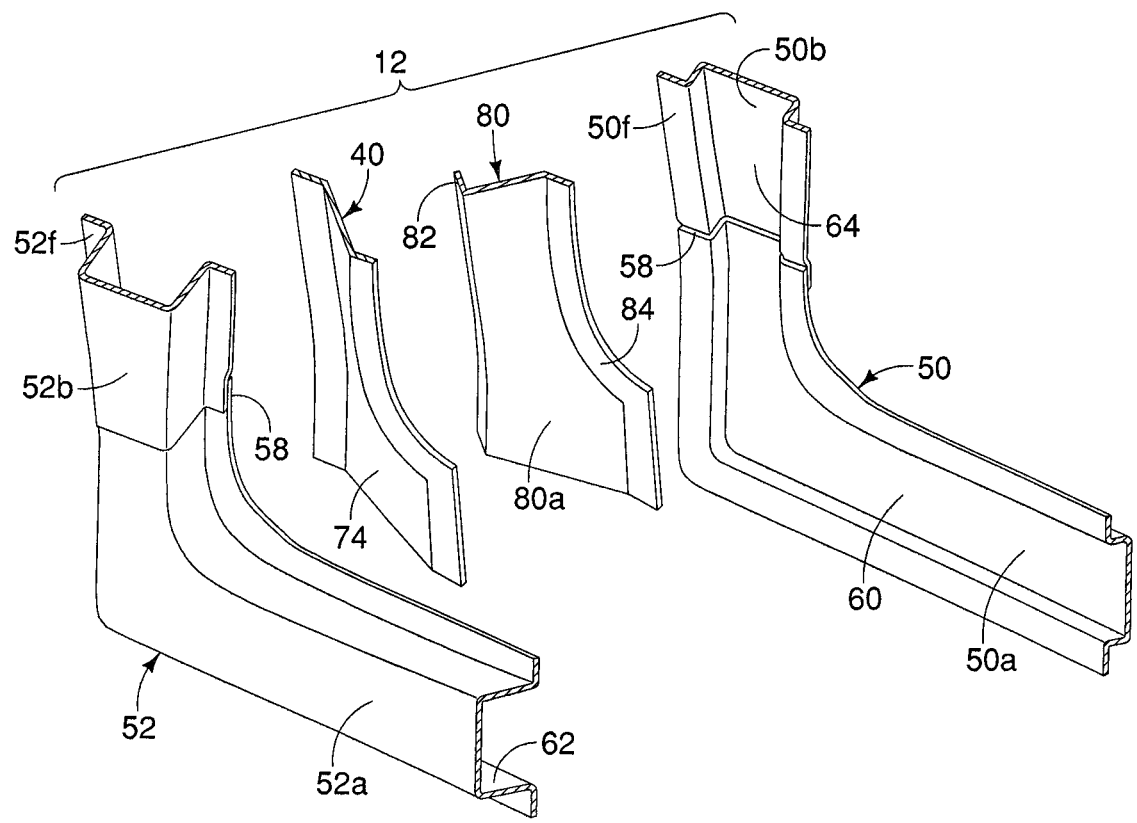
FIG. 11 is an exploded perspective view showing the portion of the inner side panel and the outer side panel that define the A-pillar and the sill with the first and second reinforcement members disposed therebetween in accordance with the second embodiment.

Referring now to FIGS. 10 and 11, the body structure 12 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The body structure 12 of the second embodiment includes all of the features of the first embodiment, such as the structures that define the sill 28, the A-pillar 30 and the reinforcement member 40. However, in the second embodiment, a second reinforcement member 80 is also included. The second reinforcement member 80 has a first end 82 fixedly attached to the main bracing part 74 of the reinforcement member 40 and a second end 84 fixedly attached to the inner sill outboard surface 60 of the inner sill panel 50*a* and the inner A-pillar outboard surface 64.

The second reinforcement member 80 is a contoured panel that includes a main bracing part 80*a* that extends between the first end 82 and the second end 84. The main bracing part 80*a* is angularly offset from the inner A-pillar outboard surface 64 and the main bracing part 74 of the reinforcement member 40. More specifically, the main bracing part 80*a* extends diagonally away from the main bracing part 74. More specifically, the main bracing part 80*a* and the main bracing part 74 define an angle that is less than 90 degrees but is close to being perpendicular.

The reinforcement member 80 has approximately the same overall height as the reinforcement member 40. The first end 82 is fixed along its entire height to the main bracing part 74 of the reinforcement member 40. The second end 84 is contoured to follow and lie against the shape of a rearward end of the inner A-pillar outboard surface 64 of the inner A-pillar panel 50*b*, and shaped to follow and lie against the inner sill outboard surface 60 of the inner sill panel 50*a*.

As shown in FIG. 10, the second reinforcement member 80 is therefore located within both the internal sill space $S_1$ and the internal A-pillar space $S_2$. More specifically, a portion of the second reinforcement member 80 extends into the internal sill space $S_1$ and a portion of the second reinforcement member 80 extends into the internal A-pillar space $S_2$. The second reinforcement member 80 is provided to reinforce the reinforcement member 40 to increase cross vehicle kinetic energy transfer during an impact event.

Third Embodiment

Figures 12, 13:
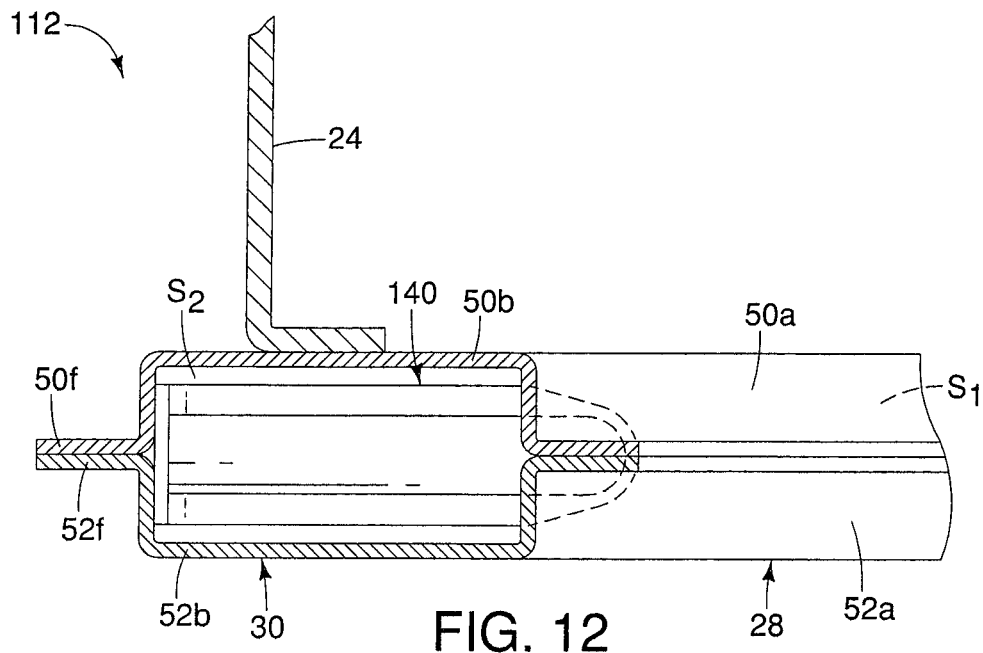
FIG. 12 is a cross-sectional view of the A-pillar similar to FIG. 8, showing details of the A-pillar, the sill and a reinforcement member in accordance with a third embodiment.
FIG. 13 is an exploded perspective view showing a portion of the inner side panel and the outer side panel that define the A-pillar and the sill with the reinforcement member disposed therebetween in accordance with the third embodiment.

Referring now to FIGS. 12 and 13, a body structure 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The body structure 112 of the third embodiment includes all of the features of the first embodiment, such as the structures that define the sill 28 and the A-pillar 30. However, in the third embodiment, the reinforcement member 40 has been replaced with a reinforcement member 140. Further, the forward flange 50*f* of the inner A-pillar panel 50*b* is directly welded to the forward flange 52*f* of the outer A-pillar panel 52*b*.

The reinforcement member 140 includes a vertical section 142, a horizontal section 144 and a main bracing part 146. The vertical section 142 has a lower end 142*a* and an upper end 142*b*. The horizontal section 144 has a forward end 144*a* and a rearward end 144*b*. The forward end 144*a* of the horizontal section 144 is rigidly fixed to the lower end 142*a* of the vertical section 142. The horizontal section 144 and the vertical section 142 can be separate metal plates welded together, or can be made from a single metal plate material, bent such that the horizontal section 144 and the vertical section 142 define a right angle therebetween.

In the depicted embodiment, the main bracing part 146 has a cylindrical shape with a forward end 146*a* and a rearward end 146*b*. The forward end 146*a* of the main bracing part 146 is fixedly attached to the upper end 142*b* of the vertical section 142 by, for example, welding. The rearward end 146*b* of the main bracing part 146 is fixedly attached to the rearward end 144*b* of the horizontal section 144 by, for example, welding.

The horizontal section 144 is fixedly attached to upwardly facing surfaces of the inner sill panel 50*a* and the outer sill panel 52*a*. The horizontal section 144 can be mechanically fastened or welded to the inner sill panel 50*a* and the outer sill panel 52*a*. The vertical section 142 is fixedly attached to rearwardly facing surfaces of the inner A-pillar panel 50*b* and the outer A-pillar panel 52*b*. The vertical section 142 can mechanically fastened or welded to the inner A-pillar panel 50*b* and the outer A-pillar panel 52*b*.

Structurally, the forward end 146*a* of the main bracing part 146 and the upper end 142*b* of the vertical section 142 define the front attachment point between the reinforcement member 140 and the A-pillar 30. Similarly, the rearward end 146*b* of the main bracing part 146 and the rearward end 144*b* of the horizontal section 144 define the rear attachment point between the reinforcement member 140 and the sill 28. As is shown in FIG. 13, the front attachment point of the reinforcement member 140 (the main bracing part 146) is located vertically higher than the rear attachment point of the reinforcement member 140 (the main bracing part 146).

As shown in FIG. 12, the reinforcement member 140 is therefore located within both the internal sill space $S_1$ and the internal A-pillar space $S_2$. More specifically, a portion of the reinforcement member 140 extends into the internal sill space $S_1$ and a portion of the reinforcement member 140 extends into the internal A-pillar space $S_2$.

Fourth Embodiment

Figure 14:
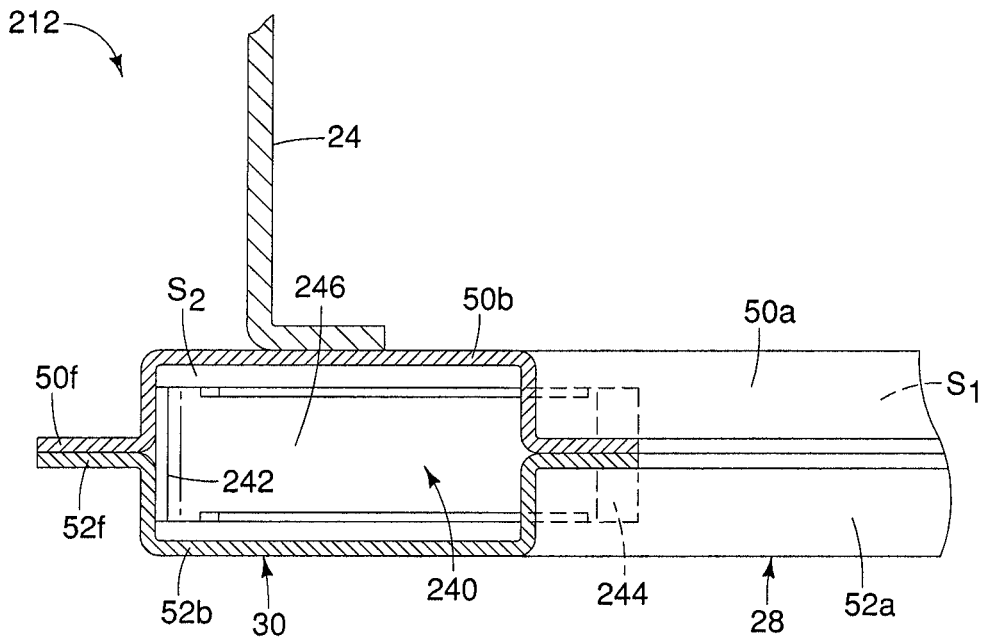
FIG. 14 is a cross-sectional view of the A-pillar similar to FIG. 8, showing details of the A-pillar, the sill and a reinforcement member in accordance with a fourth embodiment.
Figure 15:
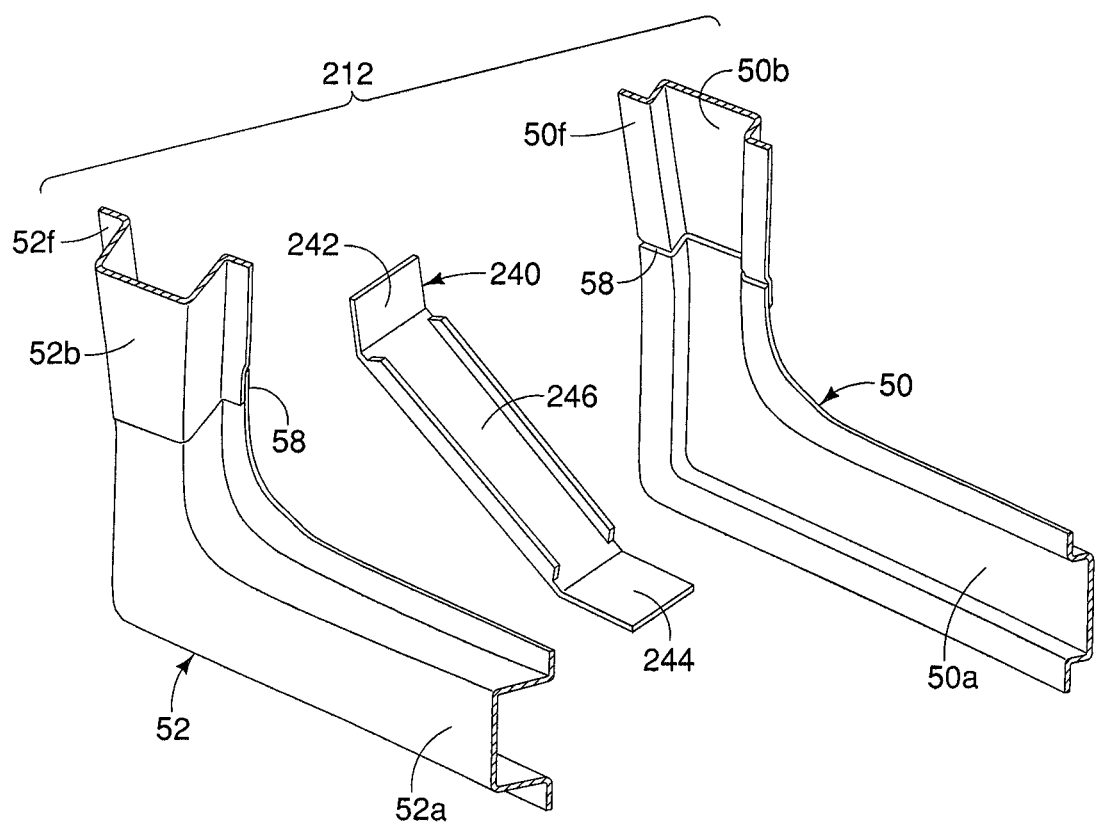
FIG. 15 is an exploded perspective view showing a portion of the inner side panel and the outer side panel that define the A-pillar and the sill with the reinforcement member disposed therebetween in accordance with the fourth embodiment.

Referring now to FIGS. 14 and 15, a body structure 212 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The body structure 212 of the fourth embodiment includes all of the features of the first embodiment, such as the structures that define the sill 28 and the A-pillar 30. However, in the fourth embodiment, the reinforcement member 40 has been replaced with a reinforcement member 240. Further, the forward flange 50*f* of the inner A-pillar panel 50*b* is directly welded to the forward flange 52*f* of the outer A-pillar panel 52*b*.

The reinforcement member 240 includes a vertical section 242, a horizontal section 244 and a main bracing part 246. The vertical section 242, the horizontal section 244 and the main bracing part 246 are formed from a single piece of sheet metal. More specifically, the vertical section 242, the horizontal section 244 and the main bracing part 246 are formed from a single piece of sheet metal, and therefore are formed as a single monolithic unitary member.

The horizontal section 244 is fixedly attached to upwardly facing surfaces of the inner sill panel 50*a* and the outer sill panel 52*a*. The horizontal section 244 can be mechanically fastened or welded to the inner sill panel 50*a* and the outer sill panel 52*a*. The vertical section 242 is fixedly attached to rearwardly facing surfaces of the inner A-pillar panel 50*b* and the outer A-pillar panel 52*b*. The vertical section 242 can be mechanically fastened or welded to the inner A-pillar panel 50*b* and the outer A-pillar panel 52*b*. The attachment between the vertical section 242 and the A-pillar 30 defines a front attachment point. The attachment between the horizontal section 244 and the sill 28 basically defines a rear attachment point.

In the depicted embodiment, the main bracing part 246 is basically a flat panel section that extends from the vertical section 242 to the horizontal section 244. Thus, the main bracing part 246 (the flat panel section) of the reinforcing member 240 extends from the front attachment point to the rear attachment point.

As shown in FIG. 14, the reinforcement member 240 is therefore located within both the internal sill space $S_1$ and the internal A-pillar space $S_2$. More specifically, a portion of the reinforcement member 240 extends into the internal sill space $S_1$ and a portion of the reinforcement member 240 extends into the internal A-pillar space $S_2$.

Fifth Embodiment

Figure 16:
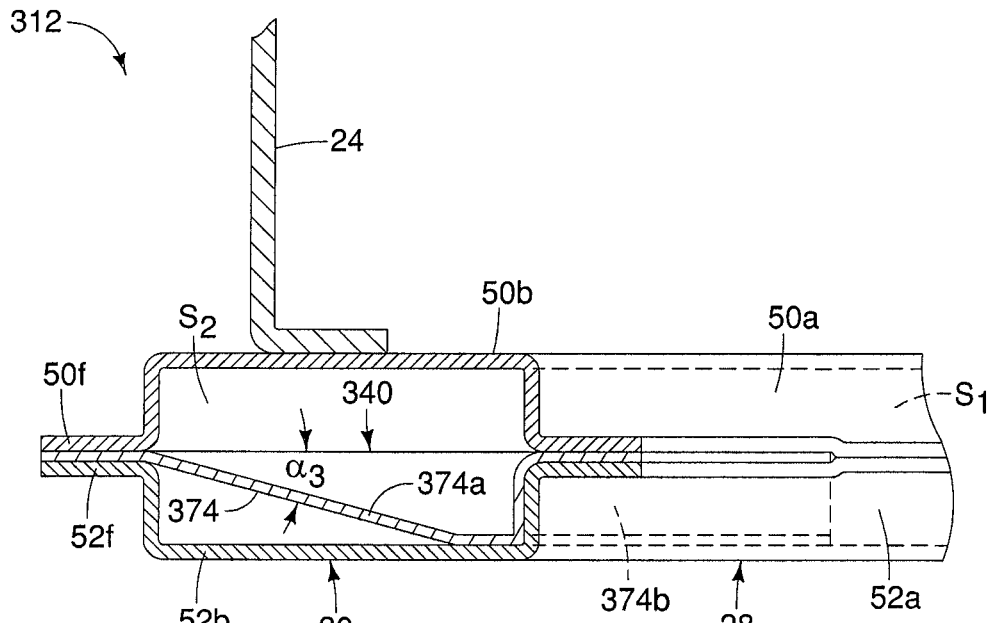
FIG. 16 is a cross-sectional view of the A-pillar similar to FIG. 8, showing details of the A-pillar, the sill and a reinforcement member in accordance with a fifth embodiment.
Figure 17:
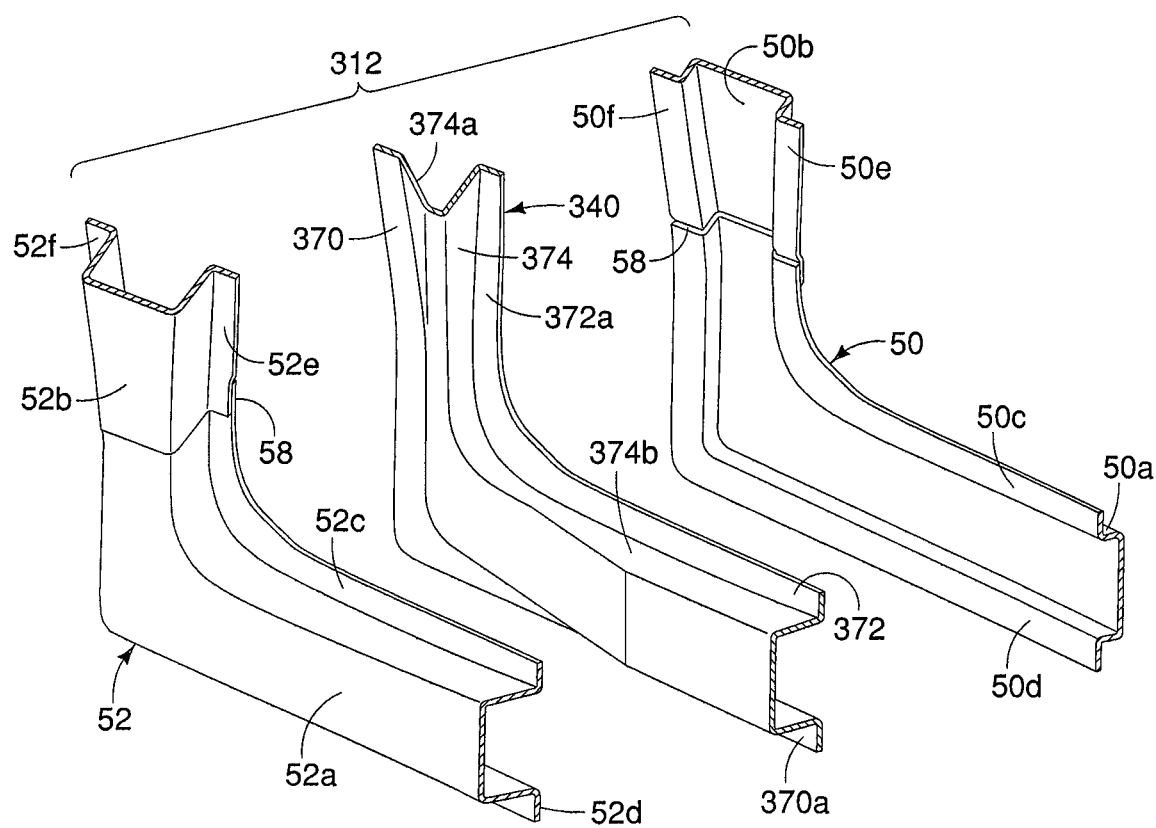
FIG. 17 is an exploded perspective view showing a portion of the inner side panel and the outer side panel that define the A-pillar and the sill with the reinforcement member disposed therebetween in accordance with the fifth embodiment.

Referring now to FIGS. 16 and 17, a body structure 312 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The body structure 312 of the fifth embodiment includes all of the features of the first embodiment, such as the structures that define the sill 28 and the A-pillar 30. However, in the fourth embodiment, the reinforcement member 40 has been replaced with a reinforcement member 340.

The reinforcement member 340 has many of the features of the reinforcement member 40 of the first embodiment, but includes more attachment locations and is longer in the vehicle longitudinal direction than the reinforcement member 40. Specifically, the reinforcement member 340 includes a forward end 370, rearward end 372 and a main bracing part 374. The forward end 370 defines a flange that extends downward and joins with a lower flange 370a. The forward end 370 is welded to and between the forward flange 50f of the inner A-pillar panel 50b and the forward flange 52f of the outer A-pillar panel 52b. Further, the lower flange 370a is welded to and between the lower flange 50d of the inner sill panel 50a and the lower flange 52d of the outer sill panel 50b.

The rearward end 372 of the reinforcement member 340 defines an upper flange that extends forward to a rearward flange 372a. The rearward end 372 and the rearward flange 372a are welded to and between the upper flange 50c of the inner sill panel 50a, the rearward flange 50e of the inner A-pillar panel 50b, and the upper flange 52c of the outer sill panel 52a and the rearward flange 52e of the outer A-pillar panel 52b, respectively.

The main bracing part 374 includes an upper section 374a and a rear section 374b. The upper section 374a defines an inclined angle $\alpha_3$ that is similar to the angle $\alpha_1$ of the first embodiment. The rear section 374b includes a plurality of contoured surfaces that serve to rigidify the intersection between the sill 18 and the A-pillar 30.

As shown in FIG. 16, the reinforcement member 340 is therefore located within both the internal sill space $S_1$ and the internal A-pillar space $S_2$. More specifically, a portion of the reinforcement member 340 extends into the internal sill space $S_1$ and a portion of the reinforcement member 340 extends into the internal A-pillar space $S_2$.

The vehicle 10 includes a variety of conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle side body structure. Accordingly, these terms, as utilized to describe the present invention should be interpreted relative to a vehicle equipped with the vehicle side body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle side body structure comprising:
a sill including an inner sill panel having an inner sill outboard surface and an outer sill panel having an outer sill inboard surface, the inner and outer sill panels being rigidly connected together to define an internal sill space between the inner sill outboard surface and the outer sill inboard surface;
an A-pillar including an inner A-pillar panel having an inner A-pillar outboard surface and an outer A-pillar panel having an outer A-pillar inboard surface, the inner and outer A-pillar panels being rigidly connected together to define an internal A-pillar space between the inner A-pillar outboard surface and the outer A-pillar inboard surface, the A-pillar being rigidly connected to the sill with the internal sill space and the internal A-pillar space being connected; and a reinforcement member located within both the internal sill space and the internal A-pillar space, the reinforcement member having a forward end fixedly attached to at least one of the sill and the A-pillar at a front attachment point and a rearward end fixedly attached to at least one of the sill and the A-pillar at a rear attachment point that is laterally offset from the front attachment point, the reinforcement member includes a main bracing part extending diagonally between the front and rear attachment points within both the internal sill space and the internal A-pillar space with respect to a vehicle longitudinal direction, with the main bracing part of the reinforcing member extending in an outboard direction from the front attachment point to the rear attachment point.

2. The vehicle side body structure according to claim 1, wherein
the main bracing part is laterally inclined relative to the vehicle longitudinal direction by an angle of at least 25 degrees.

3. The vehicle side body structure according to claim 2, wherein
the angle is 45 degrees.

4. The vehicle side body structure according to claim 1, wherein
the sill extends under a vehicle door opening with the rear attachment point of the reinforcement member being located under the vehicle door opening.

5. The vehicle side body structure according to claim 1, wherein
the sill extends under a vehicle door opening with the rear attachment point of the reinforcement member being located adjacent to a forward end of the vehicle door opening.

6. The vehicle side body structure according to claim 1, wherein
the inner A-pillar panel, the outer A-pillar panel and the reinforcement member are fixedly attached to one another at the forward end of the reinforcement member.

7. The vehicle side body structure according to claim 1, further comprising
a second reinforcement member having a first end fixedly attached to the main bracing part of the reinforcement member and a second end fixedly attached to the inner sill outboard surface of the inner sill panel.

8. The vehicle side body structure according to claim 1, wherein
the front attachment point is located vertically higher than the rear attachment point.

9. The vehicle side body structure according to claim 1, wherein
an upper edge of the main bracing part is vertically inclined relative to the vehicle longitudinal direction.

10. A vehicle side body structure comprising:
a sill including an inner sill panel having an inner sill outboard surface and an outer sill panel having an outer sill inboard surface, the inner and outer sill panels being rigidly connected together to define an internal sill space between the inner sill outboard surface and the outer sill inboard surface;
an A-pillar including an inner A-pillar panel having an inner A-pillar outboard surface and an outer A-pillar panel having an outer A-pillar inboard surface, the inner and outer A-pillar panels being rigidly connected together to define an internal A-pillar space between the inner A-pillar outboard surface and the outer A-pillar inboard surface, the A-pillar being rigidly connected to the sill with the internal sill space and the internal A-pillar space being connected; and
a reinforcement member located within both the internal sill space and the internal A-pillar space, the reinforcement member having a forward end fixedly attached to at least one of the sill and the A-pillar at a front attachment point and a rearward end fixedly attached to at least one of the sill and the A-pillar at a rear attachment point that is laterally offset from the front attachment point, the reinforcement member includes a main bracing part extending diagonally between the front and rear attachment points within both the internal sill space and the internal A-pillar space with respect to a vehicle longitudinal direction, the forward end of the reinforcement member includes an upper section and a lower section,
the inner A-pillar panel, the outer A-pillar panel and the upper section of the forward end of the reinforcement member being fixedly attached to one another, and
a forward part of the inner sill panel, a forward part of the outer sill panel and the lower section of the forward end of the reinforcement member being fixedly attached to one another.

11. The vehicle side body structure according to claim 10, wherein
the sill extends under a vehicle door opening with the rear attachment point of the reinforcement member being located under the vehicle door opening.

12. The vehicle side body structure according to claim 10, wherein
the inner sill panel and the outer sill panel are fixedly attached to one another defining a connection area that extends in the vehicle longitudinal direction and the rear attachment point of the reinforcement member is located laterally outboard of the connection area.

13. The vehicle side body structure according to claim 10, further comprising
a second reinforcement member having a first end fixedly attached to the main bracing part of the reinforcement member and a second end fixedly attached to the inner sill outboard surface of the inner sill panel.

14. The vehicle side body structure according to claim 10, wherein
the main bracing part of the reinforcement member includes a substantially flat panel section that extends from the front attachment point to the rear attachment point.

15. A vehicle side body structure comprising
a sill including an inner sill panel having an inner sill outboard surface and an outer sill panel having an outer sill inboard surface, the inner and outer sill panels being rigidly connected together to define an internal sill space between the inner sill outboard surface and the outer sill inboard surface;
an A-pillar including an inner A-pillar panel having an inner A-pillar outboard surface and an outer A-pillar panel having an outer A-pillar inboard surface, the inner and outer A-pillar panels being rigidly connected together to define an internal A-pillar space between the inner A-pillar outboard surface and the outer A-pillar inboard surface, the A-pillar being rigidly connected to the sill with the internal sill space and the internal A-pillar space being connected; and
a reinforcement member located within both the internal sill space and the internal A-pillar space, the reinforcement member having a forward end fixedly attached to at least one of the sill and the A-pillar at a front attachment point and a rearward end fixedly attached to at least one of the sill and the A-pillar at a rear attachment point that is laterally offset from the front attachment point, the reinforcement member includes a main bracing part extending diagonally between the front and rear attachment points within both the internal sill space and the internal A-pillar space with respect to a vehicle longitudinal direction, the inner sill panel and the outer sill panel are fixedly attached to one another defining a connection area that extends in the vehicle longitudinal direction and the rear attachment point of the reinforcement member is located laterally outboard of the connection area.

16. The vehicle side body structure according to claim 15, wherein the sill extends under a vehicle door opening with the rear attachment point of the reinforcement member being located under the vehicle door opening.

17. The vehicle side body structure according to claim 15, further comprising a second reinforcement member having a first end fixedly attached to the main bracing part of the reinforcement member and a second end fixedly attached to the inner sill outboard surface of the inner sill panel.

18. The vehicle side body structure according to claim 15, wherein the main bracing part of the reinforcement member includes a substantially flat panel section that extends from the front attachment point to the rear attachment point.

19. A vehicle side body structure comprising:

a sill including an inner sill panel having an inner sill outboard surface and an outer sill panel having an outer sill inboard surface, the inner and outer sill panels being rigidly connected together to define an internal sill space between the inner sill outboard surface and the outer sill inboard surface;

an A-pillar including an inner A-pillar panel having an inner A-pillar outboard surface and an outer A-pillar panel having an outer A-pillar inboard surface, the inner and outer A-pillar panels being rigidly connected together to define an internal A-pillar space between the inner A-pillar outboard surface and the outer A-pillar inboard surface, the A-pillar being rigidly connected to the sill with the internal sill space and the internal A-pillar space being connected; and a reinforcement member located within both the internal sill space and the internal A-pillar space, the reinforcement member having a forward end fixedly attached to at least one of the sill and the A-pillar at a front attachment point and a rearward end fixedly attached to at least one of the sill and the A-pillar at a rear attachment point that is laterally offset from the front attachment point, the reinforcement member includes a main bracing part extending diagonally between the front and rear attachment points within both the internal sill space and the internal A-pillar space with respect to a vehicle longitudinal direction, and the main bracing part of the reinforcement member includes a flat panel section that extends from the front attachment point to the rear attachment point.

20. A vehicle side body structure comprising a sill including an inner sill panel having an inner sill outboard surface and an outer sill panel having an outer sill inboard surface, the inner and outer sill panels being rigidly connected together to define an internal sill space between the inner sill outboard surface and the outer sill inboard surface;

an A-pillar including an inner A-pillar panel having an inner A-pillar outboard surface and an outer A-pillar panel having an outer A-pillar inboard surface, the inner and outer A-pillar panels being rigidly connected together to define an internal A-pillar space between the inner A-pillar outboard surface and the outer A-pillar inboard surface, the A-pillar being rigidly connected to the sill with the internal sill space and the internal A-pillar space being connected;

a reinforcement member located within both the internal sill space and the internal A-pillar space, the reinforcement member having a forward end fixedly attached to at least one of the sill and the A-pillar at a front attachment point and a rearward end fixedly attached to at least one of the sill and the A-pillar at a rear attachment point that is laterally offset from the front attachment point, the reinforcement member includes a main bracing part extending diagonally between the front and rear attachment points within both the internal sill space and the internal A-pillar space with respect to a vehicle longitudinal direction; and a second reinforcement member having a first end fixedly attached to the main bracing part of the reinforcement member and a second end fixedly attached to the inner sill outboard surface of the inner sill panel.

* * * * *